United States Patent
Shuman et al.

(10) Patent No.: US 12,131,643 B2
(45) Date of Patent: Oct. 29, 2024

(54) SENSOR DATA SHARING FOR AUTOMOTIVE VEHICLES

(71) Applicant: QUALCOMM Incorporated, San Diego, CA (US)

(72) Inventors: Mohammed Ataur Rahman Shuman, San Diego, CA (US); Dan Vassilovski, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 365 days.

(21) Appl. No.: 17/479,819

(22) Filed: Sep. 20, 2021

(65) Prior Publication Data

US 2023/0091064 A1 Mar. 23, 2023

(51) Int. Cl.
G08G 1/16 (2006.01)
H04W 4/38 (2018.01)
H04W 4/46 (2018.01)

(52) U.S. Cl.
CPC ............. *G08G 1/163* (2013.01); *H04W 4/38* (2018.02); *H04W 4/46* (2018.02)

(58) Field of Classification Search
CPC .......... G08G 1/163; H04W 4/38; H04W 4/46
See application file for complete search history.

(56) References Cited

U.S. PATENT DOCUMENTS

| | | | |
|---|---|---|---|
| 8,922,390 B2 * | 12/2014 | Stahlin | G08G 1/161 340/902 |
| 2013/0120159 A1 | 5/2013 | Ulrich et al. | |
| 2020/0037343 A1 | 1/2020 | He et al. | |
| 2020/0288431 A1 | 9/2020 | Lee et al. | |
| 2021/0258920 A1 | 8/2021 | Baghel et al. | |
| 2023/0179971 A1 * | 6/2023 | Hehn | H04W 4/46 340/425.5 |
| 2023/0269566 A1 * | 8/2023 | Spagnolini | G01S 7/003 455/39 |
| 2023/0319525 A1 * | 10/2023 | Cui | H04W 4/40 370/329 |

OTHER PUBLICATIONS

International Search Report and Written Opinion—PCT/US2022/074598—ISA/EPO—Nov. 22, 2022.

* cited by examiner

*Primary Examiner* — Chandrahas B Patel
(74) *Attorney, Agent, or Firm* — QUALCOMM Incorporated (57) ABSTRACT

System and method for sharing data about an object in accordance to various aspects. A mobile device comprises: a memory; a sensor to detect an object and generate data about the object; and at least one processor communicatively coupled to the memory, the at least one processor configured to: receive the data from the sensor; determine a relevance of the data; and choose an interface for transmitting the data based on the relevance.

32 Claims, 4 Drawing Sheets

SENSOR DATA SHARING FOR AUTOMOTIVE VEHICLES

BACKGROUND OF THE DISCLOSURE

1. Field of the Disclosure

Aspects of the disclosure relate generally to sensor data sharing for automotive vehicles.

2. Description of the Related Art

Lately, many vehicles are adopting vehicle-to-everything (V2X) technology that allows a vehicle to communicate with various components in the traffic system that may affect or affected by the vehicle. V2X has various types of communication such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid).

V2X technology facilitates a smoother operation of the traffic by increasing safety and preventing collisions. For example, a vehicle equipped with V2X technology can inform the driver of the vehicle about the weather, nearby accidents, road conditions and other activities that may affect the safety of the vehicle. Furthermore, V2X may be used in autonomous driving system to safely steer the vehicle. Thus, a V2X system on a vehicle needs to constantly communicate with many other entities and objects in the traffic such as other vehicles, roadside objects, cyclist and pedestrians.

Therefore, there is a need for more efficient ways for a vehicle with V2X system to communicate with other entities and objects in the traffic.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of sharing data about an object includes detecting the object by using a sensor; generating the data about the object based on the detection; receiving the data from the sensor; determining a relevance of the data; and choosing an interface for transmitting the data based on the relevance.

In an aspect, a mobile device includes a memory; a sensor to detect an object and generate data about the object; and at least one processor communicatively coupled to the memory, the at least one processor configured to: receive the data from the sensor; determine a relevance of the data; and choose an interface for transmitting the data based on the relevance.

In an aspect, a mobile device includes means for detecting an object by using a sensor; means for generating data about the object based on the detection; means for receiving the data from the sensor; means for determining a relevance of the data; and means for choosing an interface for transmitting the data based on the relevance.

In an aspect, a non-transitory computer-readable medium storing computer-executable instructions that, when executed by a processor, cause the processor to: receive data about an object from a sensor; determine a relevance of the data; and choose an interface for transmitting the data based on the relevance.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Figure 1:
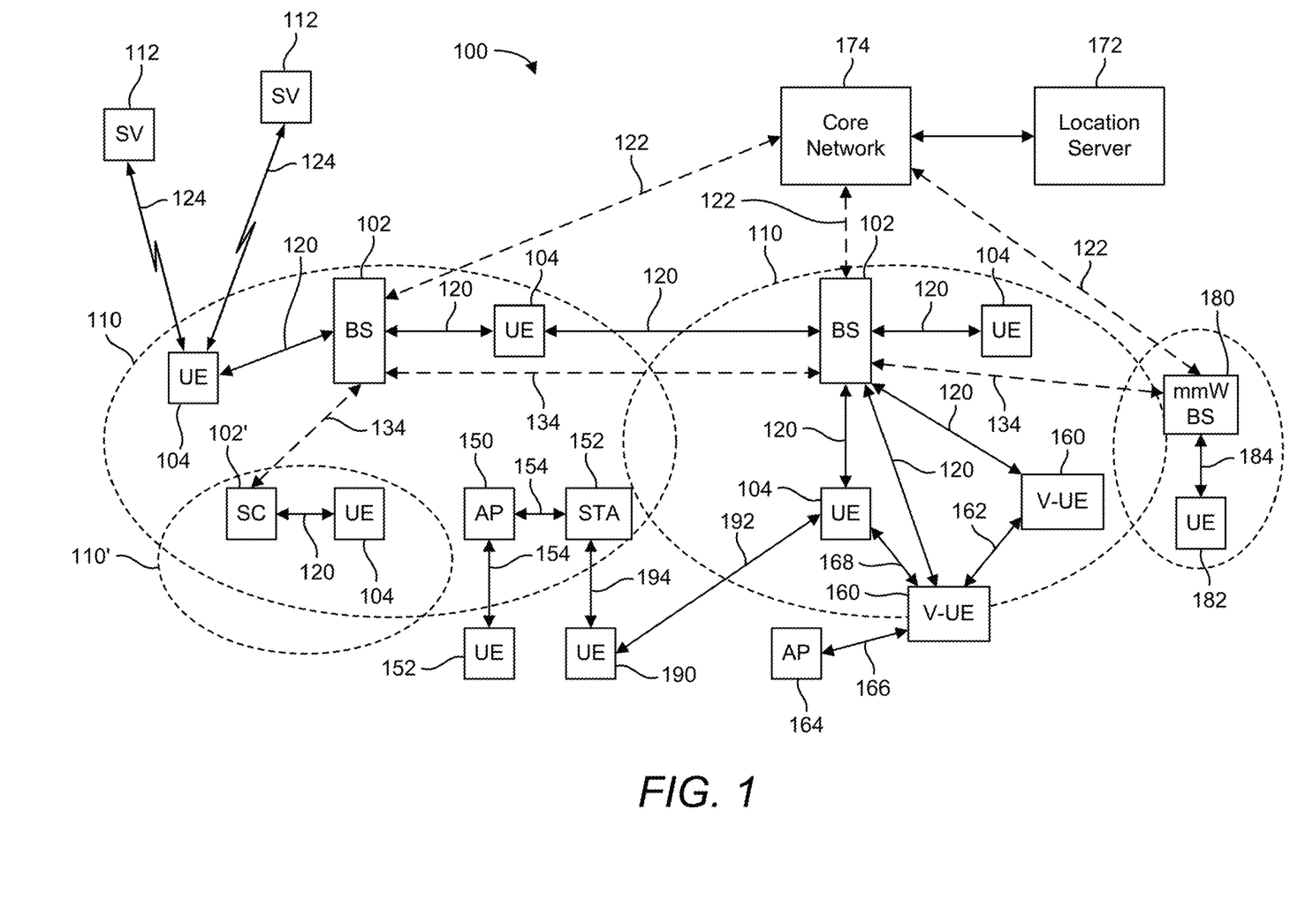
FIG. 1 illustrates an example wireless communications system, according to aspects of the disclosure.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
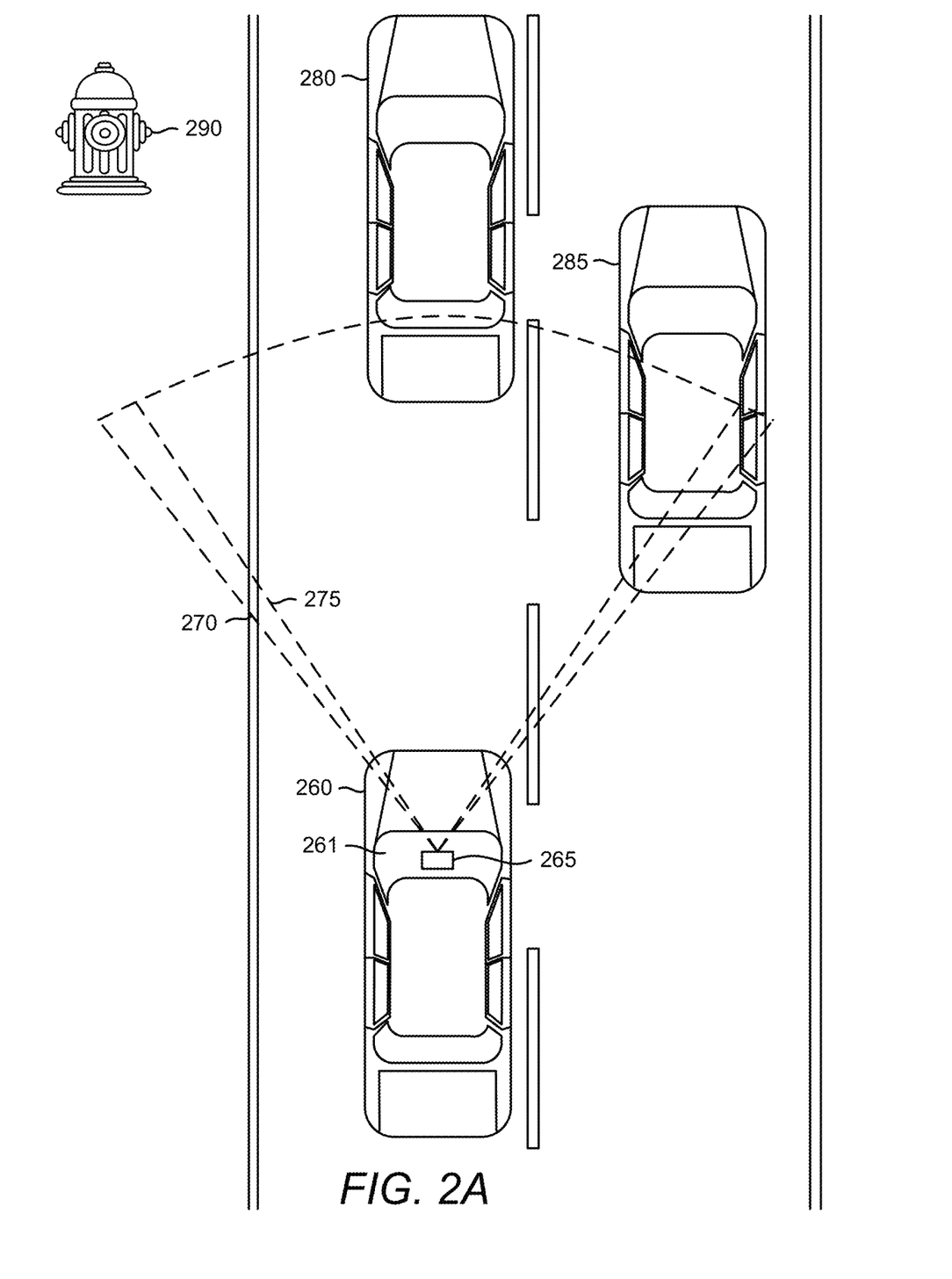
FIG. 2A is a top view of vehicles and objects employing V2X technology, according to various aspects.
Figure 2B:
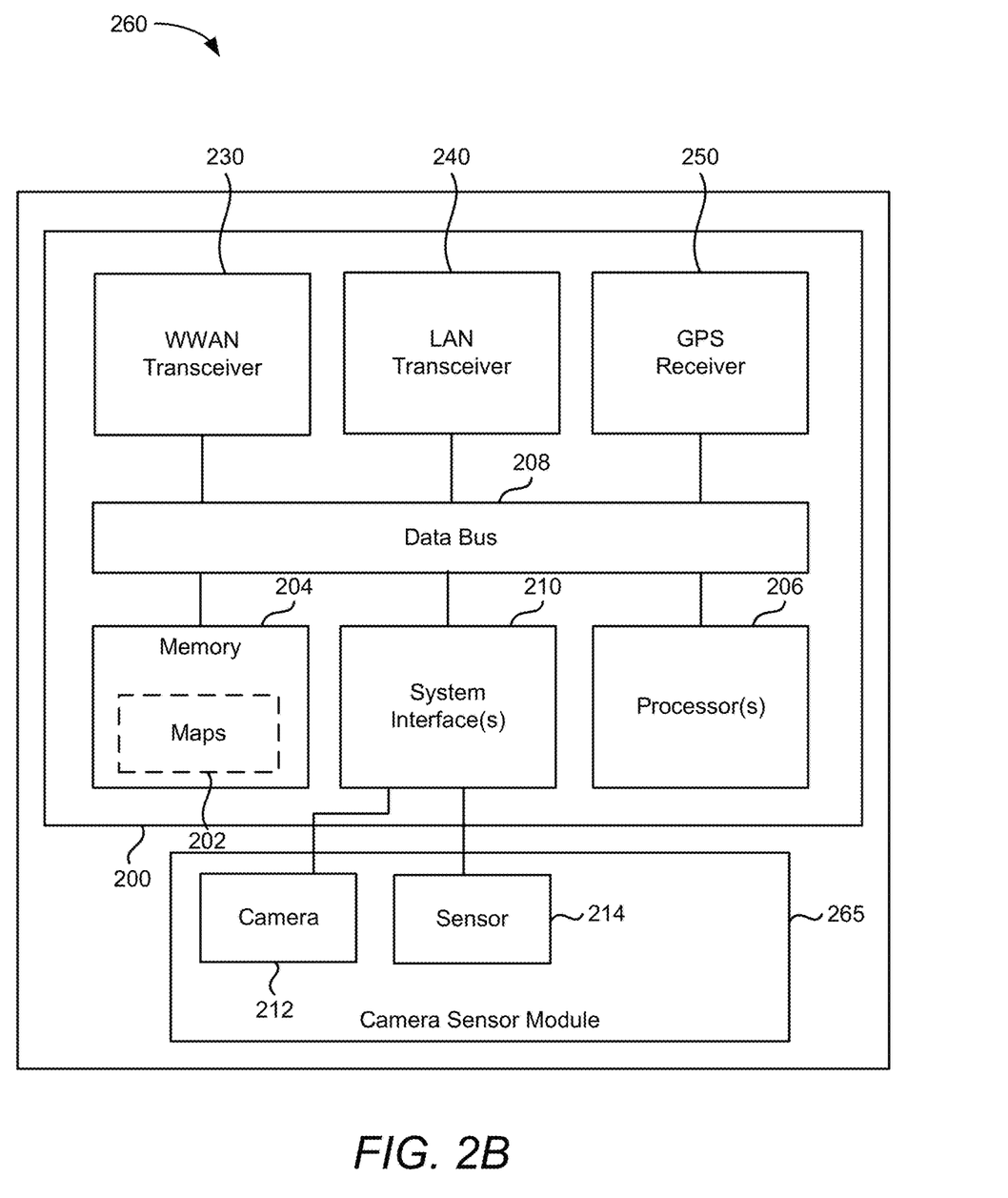
FIG. 2B illustrates an on-board computer architecture, according to various aspects.

Referring now to FIG. 2A, vehicle 260 (referred to as an "ego vehicle" or "host vehicle") is illustrated that includes camera sensor module 265 located in the interior compartment of vehicle 260 behind windshield 261. In an aspect, camera sensor module 265 may be located anywhere in vehicle 260. In an aspect, vehicle 260 may be equipped with V2X technology that allows vehicle 260 to communicate with other V2X capable entities such as vehicles with on-board unit (OBU) with V2X capability, roadside unit (RSU) with V2X capability and vulnerable road user (VRU) with V2X capability. In an aspect, camera sensor module 265 may include sensor 214 with coverage zone 270, as shown in FIGS. 2A and 2B. Camera sensor module 265 further includes camera 212 for capturing images based on light waves that are seen and captured through the windshield 261 in a horizontal coverage zone 275 (shown by dashed lines). In an aspect, camera sensor module 265 may include one or more sensors 214 such as a lidar sensor, a radar sensor, inertial measurement unit (IMU), velocity sensor and/or any other sensor that may aid in the operation of vehicle 260 including V2X technology.

Although FIG. 2A illustrates an example in which the sensor component and the camera component are collocated components in a shared housing, as will be appreciated, they may be separately housed in different locations within vehicle 260. For example, camera 212 may be located as shown in FIG. 2A, and sensor 214 may be located in the grill or front bumper of the vehicle 260. Additionally, although FIG. 2A illustrates camera sensor module 265 located behind windshield 261, it may instead be located in a rooftop sensor array, or elsewhere. In an aspect, although FIG. 2A illustrates only a single camera sensor module 265, as will be appreciated, vehicle 260 may have multiple camera sensor modules 265 pointed in different directions (to the sides, the front, the rear, etc.). The various camera sensor modules 265 may be under the "skin" of the vehicle (e.g., behind the windshield 261, door panels, bumpers, grills, etc.) or within a rooftop sensor array.

Camera sensor module 265 may detect one or more (or none) objects relative to vehicle 260. In the example of FIG. 2A, there are two objects, vehicles 280 and 285, within the horizontal coverage zones 270 and 275 that camera sensor module 265 can detect. In an aspect, camera sensor module 265 may estimate parameters of the detected object(s), such as the position, range, direction, speed, size, classification (e.g., vehicle, pedestrian, road sign, OBU, VRU, RSU etc.), and the like. Camera sensor module 265 may be employed by vehicle 260 for automotive safety applications, such as adaptive cruise control (ACC), forward collision warning (FCW), collision mitigation or avoidance via autonomous braking, lane departure warning (LDW), and the like. Furthermore, in an aspect, camera sensor module 265 may be employed for V2X communication technology as described below.

FIG. 2B illustrates on-board computer (OBC) 200 of vehicle 260, according to various aspects of the disclosure. In an aspect, OBC 200 may be an OBU installed on a vehicle such as vehicle 260. In an aspect, OBC 200 and camera sensor module 265 may be a part of an ADAS or ADS of vehicle 260. In another aspect, OBC 200 may employ V2X communication technology to communicate with other entities on the road such as OBU, RSU and VRU. In an aspect, it will be noted that vehicle 260 with OBC 200 may be similar to V-UEs 160, and OBC 200 may be similar to UE 104, 190 or any other UEs shown in FIG. 1 and may further comprise one or more components as known to one skilled in the art, but which are not illustrated in FIG. 2B. Thus, in an aspect, OBC 200 may be considered to be a mobile device. In some aspects, a mobile device may be considered as a "handset," a "UE," a "V-UE," an "access terminal" or "AT," a "client device," a "wireless device," a "subscriber device," a "subscriber terminal," a "subscriber station," a "user terminal" or "UT," a "mobile terminal," a "mobile station," "OBC", or variations thereof. OBC 200 includes a non-transitory computer-readable storage medium, i.e., memory 204, and one or more processors 206 in communication with memory 204 via a data bus 208. Memory 204 includes one or more storage modules storing computer-readable instructions executable by processor(s) 206 to perform the functions of OBC 200 described herein. For example, processor(s) 206 in conjunction with memory 204 may implement various neural network architectures.

One or more camera sensor modules 265 are coupled to OBC 200 (only one is shown in FIG. 2B for simplicity). In some aspects, camera sensor module 265 includes at least one camera 212 and at least one sensor 214. Sensor 214 may include one or more of a lidar sensor, a radar sensor, inertial measurement unit (IMU), velocity sensor and/or any other sensor that may aid in the operation of vehicle 260. OBC 200 also includes one or more system interfaces 210 connecting processor(s) 206, by way of the data bus 208, to the camera sensor module 265 and, optionally, other vehicle sub-systems (not shown).

OBC 200 also includes, at least in some cases, wireless wide area network (WWAN) transceiver 230 configured to communicate via one or more wireless communication networks (not shown), such as an NR network, an LTE network, a GSM network, and/or the like. WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, OBC 200 may use WWAN transceiver 230 to transmit and receive sensor data sharing messages (SDSM) over the Uu interface to perform various V2X/C-V2X communications such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid) communication. In another aspect, OBC 200 may use WWAN transceiver 230 to transmit and receive SDSM over the ProSe Communication-5 (PC5) interface to perform various V2X communications such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid) communication.

OBC 200 also includes, at least in some cases, wireless local area network (WLAN) transceiver 240. WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, OBC 200 may use WLAN transceiver 240 to perform various V2X communications such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid) communication by transmitting and receiving SDSM.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

OBC 200 also includes, at least in some cases, global positioning systems (GPS) receiver 250. GPS receiver 250 may be connected to one or more antennas (not shown) for receiving satellite signals. GPS receiver 250 may comprise any suitable hardware and/or software for receiving and processing GPS signals. GPS receiver 250 requests information and operations as appropriate from the other systems and performs the calculations necessary to determine the vehicle's 260 position using measurements obtained by any suitable GPS algorithm.

In an aspect, OBC 200 may utilize WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 260. Map(s) 202 may also provide electronic horizon predictive awareness, which enables the vehicle 260 to know what lies ahead.

In an aspect, camera 212 may capture image frames (also referred to herein as camera frames) of the scene within the viewing area of camera 212 (as illustrated in FIG. 2A as horizontal coverage zone 275) at some periodic rate to detect objects in the surrounding environment such as vehicles 280 and 285 and RSU 290. In an aspect, OBC 200 may use sensor 214 to detect objects in the surrounding environment in addition to camera 212. As stated above sensor 214 may include one or more of a lidar sensor, a radar sensor, inertial measurement unit (IMU), velocity sensor and/or any other sensor that may aid in the operation of vehicle 260.

In the example shown in FIG. 2A, vehicle 260 may detect objects in the surrounding environment including two vehicles 280 and 285 and RSU 290 by using camera 212 and sensor 214 in camera sensor module 265. Processor 206 may receive the data regarding the detected objects from camera sensor module 265. The received data may include the velocity of vehicles 280 and 285, the size of vehicles 280 and 285, the distance of vehicles 280 and 285 from vehicle 260, the road condition, the weather, the visibility, the usage of a map, the terrain, the time of the day, etc. The received data may further include data about RSU 290.

Based on the received data, processor 206 may analyze the received data to determine the relevance of the data based on the distance and time span in relation to vehicle 260 and other entities in the V2X network. In other words, processor 206 may determine the distance relevance based on what entities or objects in the V2X network may be affected by the received data and based on how far those entities and objects are from vehicle 260. For example, in FIG. 2A, vehicle 280 and vehicle 285 are traveling in close proximity to vehicle 260. Thus, the actions of vehicles 280 and 285 will likely affect other entities (such as OBU, VRU and RSU) that are in close proximity to vehicle 260 such as RSU 290. It is highly unlikely that the actions of vehicles 280 and 285 will affect entities that are miles away from vehicle 260. Thus, processor 206 may determine that the data received from camera sensor module 265 regarding vehicles 280 and 285 are relevant to entities and objects that are in close proximity to vehicle 260 and not to entities that are far or in distant proximity to vehicle 260. Therefore, the distance relevance of the data regarding vehicles 280 and 285 is close proximity relevance.

In an aspect, in addition to determining the distance relevance of the received data, processor 206 may determine the time span relevance of the received data. Processor 206 may determine the time span relevance based on how far in time the data is useful or relevant. For example, the data received from camera sensor module 265 regarding vehicle 280 and 285 may be relevant or useful in the near future and not in the distant future. If vehicle 280 suddenly slows down, the data detected by camera sensor module 265 will likely reflect the slow down of vehicle 280. Processor 206 may receive the data showing the slow down and determine how far in time this data is useful to vehicle 260 and other entities in the V2X network. The received data may be useful in the near future or in the distant future. Processor 206 may determine that the data showing the slow down may be useful in the near future and not in the distant future. The data regarding the actions of vehicle 280 will not likely affect the actions of vehicle 260 or other entities in the V2X network one hour from now. Thus, the time span relevance of the data regarding vehicles 280 and 285 will likely have a relevance in the near future and not in the distant future.

The above example illustrates a case where the data detected by camera sensor module 265 was determined to have a distance relevance of close proximity and a time span relevance of near future. In an aspect, if processor 206 determines that the data received from camera sensor module 265 have a distance relevance of close proximity and a time span relevance of near future, processor 206 may transmit SDSM to entities in the V2X network such as vehicles 280 and 285 and RSU 290 using the PC5 interface. By using the PC5 interface, vehicle 260 may quickly transmit a relevant SDSM to other nearby entities. For example, vehicle 260 may send SDSM alerting vehicle 280 (assuming it has V2X technology) that vehicle 285 is in the blind spot of vehicle 280 by using PC5 interface.

As shown in FIG. 2A, camera sensor module 265 may detect RSU 290 and transmit the data regarding RSU 290 to processor 206. In the example shown in FIG. 2A, RSU 290 may be a fire hydrant equipped with or without V2X technology. Based on the data from camera sensor module 265, processor 206 may determine that RSU 290 is leaking small amount of water, for example. Based on the determination that RSU 290 is leaking small amount of water, processor 206 may determine the distance relevance and the time span relevance of this fact. Processor 206 may determine that the small water leakage from RSU 290 affects entities that are far from vehicle 260 such as the local water company so that the distance relevance of the RSU 290 data is distant proximity. In addition, processor 206 may determine that the time span relevance of the data is distant future since the small water leakage does not affect the actions of vehicle 260 or other entities in the near future. In an aspect, if processor 206 determines that the data received from camera sensor module 265 have a distance relevance of distant proximity and a time span relevance of distant future, processor 206 may transmit SDSM to the V2X network or other entities using V2I or V2N interfaces such as the Uu interface since such data does not have any immediate consequences to nearby entities. For example, vehicle 260 may send a SDSM alert to a local water company through the Uu or V2I interface to alert the water company that RSU 290 is leaking water. In an aspect, the Uu interface may be a radio interface that connects the UEs to the eNodeBs, gNBs or base stations.

As shown in FIG. 2A, camera sensor module 265 detects vehicles 280 and 285 using camera sensor module 265. In the previous example, it was assumed that both vehicles 280 and 285 were traveling in front of vehicle 260. In this example, it is assumed that vehicle 280 is traveling in front of vehicle 260, but vehicle 285 is stationary and blocks the road. Camera sensor module 265 may transmit the data regarding vehicles 280 and 285 to processor 206, and processor 206 may determine that vehicle 280 is traveling in front of vehicle 260 but vehicle 285 is stationary and blocks the road. Based on the received data, processor 206 may determine the distance relevance and the time span relevance of the received data. In the current example, processor 206 may determine that the data has a distance relevance of both close and distant proximity because the stationary vehicle 285 may affect the actions of vehicle 260 and other entities that are close to vehicle 260 such as vehicles that are behind vehicle 260. Vehicles that are traveling behind vehicle 260 may collide with stationary vehicle 285. In addition, vehicles that are far from vehicle 260 may eventually reach stationary vehicle 285 and collide into vehicle 285. Thus, the data received from camera sensor module 265 regarding vehicle 285 may have a relevance to vehicles that are close to vehicle 260 and to vehicles that are far from vehicle 260. Therefore, the data received from camera sensor module 265 regarding vehicle 285 indicate that the distance relevance is both close and distant proximity.

In addition, processor 206 may determine that the data regarding vehicle 285 has a time span relevance of both the near and distant futures because the stationary vehicle 285 may affect the actions of vehicle 260 and other vehicles that are close to vehicle 260 in the near future and the actions of vehicles far from vehicle 285 that may eventually approach vehicle 285 in the distant future. Thus, the data regarding vehicle 285 has a relevance to vehicles that are approaching vehicle 285 in the near future and vehicles that are approaching vehicle 285 in the distant future. Therefore, the data received from camera sensor module 265 regarding vehicle 285 has a time span relevance of both the near and distant futures. In an aspect, if processor 206 determines that the data received from camera sensor module 265 has a distance relevance of both the close proximity and distant proximity and a time span relevance of both the near future and distant future, processor 206 may transmit SDSM by using both the PC5 interface and V2N/V2I interface such as the Uu interface. The PC5 interface may be used to transmit SDSM to nearby entities, and the Uu interface may used to transmit to far away entities or to V2X network.

In an aspect, processor 206 may transmit the data received from camera sensor module 265 to a network server (not shown) using the Uu interface. The network server may determine the distance relevance and the time span relevance of the received data. The network server may then direct processor 206 to transmit SDSM to other entities around vehicle 260 using appropriate interfaces such as PC5, V2N, V2I and/or Uu interfaces based on the determination made by the network server.

The components of OBC 200 in FIG. 2B may be implemented in various ways. In some implementations, the components of OBC 200 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 202 to 250 in OBC 200 may be implemented by processor and memory component(s) of OBC 200 (e.g., by execution of appropriate code and/or by appropriate configuration of processor components). However, as will be appreciated, such operations, acts, and/or functions may actually be performed by specific components or combinations of components of OBC 200.

Figure 3:
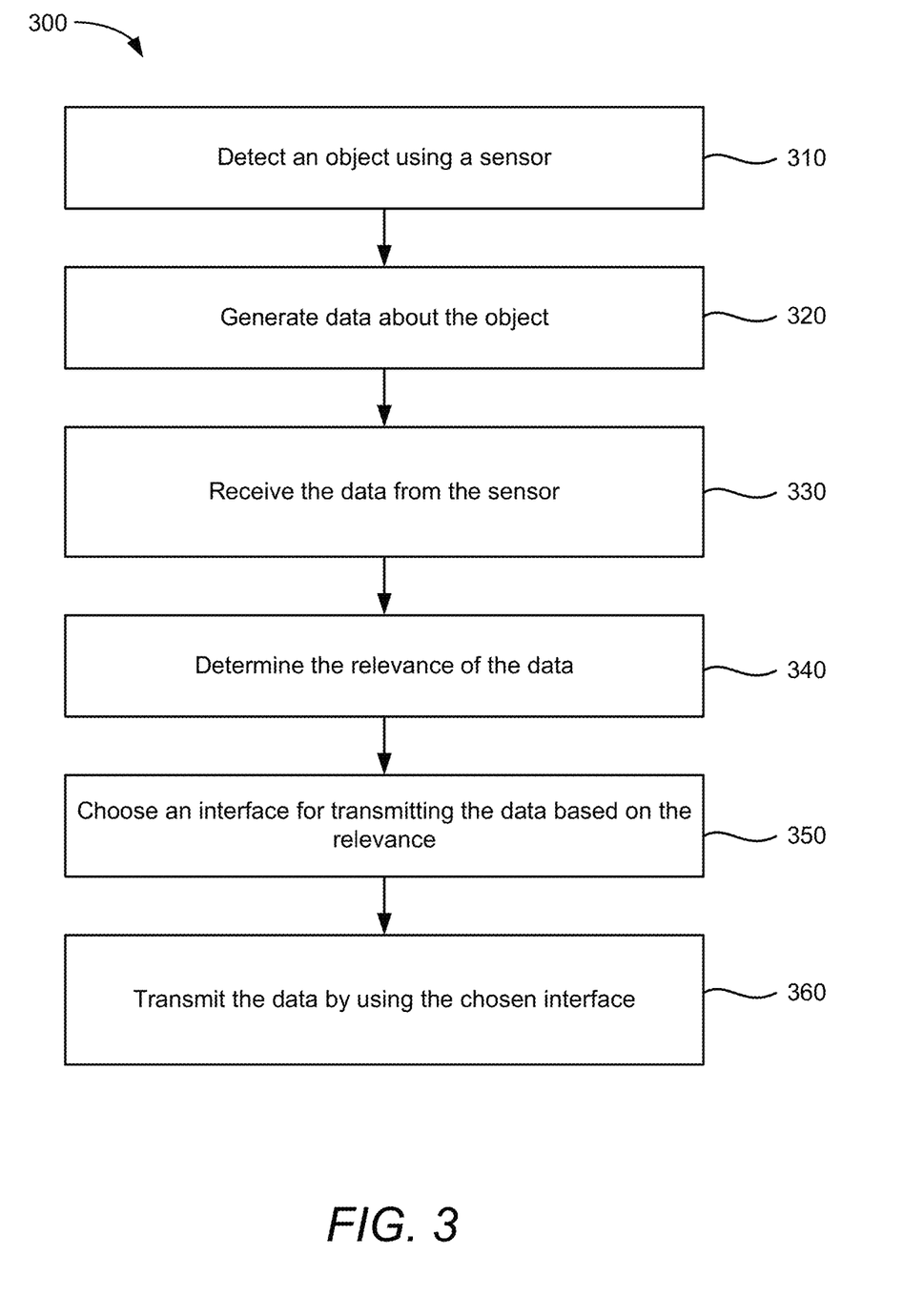
FIG. 3 illustrate exemplary methods of sharing data about an object, according to aspects of the disclosure.

It will be appreciated that aspects include various methods for performing the processes, functions and/or algorithms disclosed herein. For example, FIG. 3 show method 300 for sharing data about an object in accordance to an aspect. The method may be performed by a device such as OBC 200, processor 206, vehicle 260, V-UEs 160, UE 104, 190 or other UEs shown in FIG. 1.

At block 310, the method detects an object using a sensor. Camera sensor module 265 on vehicle 260 may detect an object.

At block 320, the method generates data about the object. Camera sensor module 265 may generate data about the detected object.

At block 330, the method receives the data from the sensor. Processor 206 may receive the data from camera sensor module 265.

At block 340, the method determines the relevance of the data. Processor 206 may determine the relevance of the data received from camera sensor module. The relevance includes distance relevance and time span relevance. In another aspect, a network server may determine the relevance of the data.

At block 350, the method chooses an interface for transmitting the data based on the relevance. Processor 206 may choose an interface for transmitting the data based on the relevance. Processor 206 may choose the PC5 interface and/or V2I/V2N interface such as the Uu interface.

At block 360, the method transmits the data by using the chosen interface. Processor 206 may transmit the data to other entities in the V2X network by using the chosen interface.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of sharing data about an object, the method comprising: detecting the object by using a sensor; generating the data about the object based on the detection; receiving the data from the sensor; determining a relevance of the data; and choosing an interface for transmitting the data based on the relevance.

Clause 2. The method of clause 1, wherein the relevance comprises a distance relevance of the data.

Clause 3. The method of clause 2, wherein the relevance further comprises a time span relevance of the data.

Clause 4. The method of any of clauses 2 to 3, wherein the distance relevance is based on another object that is affected by the data and a distance from the another object to the sensor.

Clause 5. The method of any of clauses 3 to 4, wherein the time span relevance is based on how far in time the data is useful.

Clause 6. The method of any of clauses 3 to 5, further comprising: transmitting the data using the chosen interface.

Clause 7. The method of clause 6, wherein the chosen interface is a PC5 interface when the distance relevance is close proximity and the time span relevance is near future.

Clause 8. The method of any of clauses 6 to 7, wherein the chosen interface is a V2N or V2I interface when the distance relevance is distant proximity and the time span relevance is distant future.

Clause 9. The method of any of clauses 6 to 8, wherein the chosen interface is a PC5 interface and a V2N interface when the distance relevance is both close proximity and distant proximity and the time span relevance is both near future and distant future.

Clause 10. The method of any of clauses 6 to 9, wherein the V2N interface is an Uu interface.

Clause 11. A mobile device, comprising: a memory; a sensor to detect an object and generate data about the object; and at least one processor communicatively coupled to the memory, the at least one processor configured to: receive the data from the sensor; determine a relevance of the data; and choose an interface for transmitting the data based on the relevance.

Clause 12. The mobile device of clause 11, wherein the relevance comprises a distance relevance of the data.

Clause 13. The mobile device of clause 12, wherein the relevance further comprises a time span relevance of the data.

Clause 14. The mobile device of any of clauses 12 to 13, wherein the distance relevance is based on another object that is affected by the data and a distance from the another object to the sensor.

Clause 15. The mobile device of any of clauses 13 to 14, wherein the time span relevance is based on how far in time the data is useful.

Clause 16. The mobile device of any of clauses 13 to 15, wherein the at least one processor is further configured to: transmit the data using the chosen interface.

Clause 17. The mobile device of clause 16, wherein the chosen interface is a PC5 interface when the distance relevance is close proximity and the time span relevance is near future.

Clause 18. The mobile device of any of clauses 16 to 17, wherein the chosen interface is a V2N or V2I interface when the distance relevance is distant proximity and the time span relevance is distant future.

Clause 19. The mobile device of any of clauses 16 to 18, wherein the chosen interface is a PC5 interface and a V2N interface when the distance relevance is both close proximity and distant proximity and the time span relevance is both near future and distant future.

Clause 20. The mobile device of any of clauses 16 to 19, wherein the V2N interface is an Uu interface.

Clause 21. A mobile device, comprising: means for detecting an object by using a sensor; means for generating data about the object based on the detection; means for receiving the data from the sensor; means for determining a relevance of the data; and means for choosing an interface for transmitting the data based on the relevance.

Clause 22. The mobile device of clause 21, wherein the relevance comprises a distance relevance of the data.

Clause 23. The mobile device of clause 22, wherein the relevance further comprises a time span relevance of the data.

Clause 24. The mobile device of any of clauses 22 to 23, wherein the distance relevance is based on another object that is affected by the data and a distance from the another object to the sensor.

Clause 25. The mobile device of any of clauses 23 to 24, wherein the time span relevance is based on how far in time the data is useful.

Clause 26. The mobile device of any of clauses 23 to 25, further comprising: means for transmitting the data using the chosen interface.

Clause 27. The mobile device of clause 26, wherein the chosen interface is a PC5 interface when the distance relevance is close proximity and the time span relevance is near future.

Clause 28. The mobile device of any of clauses 26 to 27, wherein the chosen interface is a V2N or V2I interface when the distance relevance is distant proximity and the time span relevance is distant future.

Clause 29. The mobile device of any of clauses 26 to 28, wherein the chosen interface is a PC5 interface and a V2N interface when the distance relevance is both close proximity and distant proximity and the time span relevance is both near future and distant future.

Clause 30. The mobile device of any of clauses 26 to 29, wherein the V2N interface is an Uu interface.

Clause 31. A non-transitory computer-readable medium storing computer-executable instructions that, when executed by a processor, cause the processor to: receive data about an object from a sensor; determine a relevance of the data; and choose an interface for transmitting the data based on the relevance.

Clause 32. The non-transitory computer-readable medium of clause 31, wherein the relevance comprises a distance relevance of the data.

Clause 33. The non-transitory computer-readable medium of clause 32, wherein the relevance further comprises a time span relevance of the data.

Clause 34. The non-transitory computer-readable medium of any of clauses 32 to 33, wherein the distance relevance is based on another object that is affected by the data and a distance from the another object to the sensor.

Clause 35. The non-transitory computer-readable medium of any of clauses 33 to 34, wherein the time span relevance is based on how far in time the data is useful.

Clause 36. The non-transitory computer-readable medium of any of clauses 33 to 35, further comprising computer-executable instructions that, when executed by the processor, cause the processor to: transmit the data using the chosen interface.

Clause 37. The non-transitory computer-readable medium of clause 36, wherein the chosen interface is a PC5 interface when the distance relevance is close proximity and the time span relevance is near future.

Clause 38. The non-transitory computer-readable medium of any of clauses 36 to 37, wherein the chosen interface is a V2N or V2I interface when the distance relevance is distant proximity and the time span relevance is distant future.

Clause 39. The non-transitory computer-readable medium of any of clauses 36 to 38, wherein the chosen interface is a PC5 interface and a V2N interface when the distance relevance is both close proximity and distant proximity and the time span relevance is both near future and distant future.

Clause 40. The non-transitory computer-readable medium of any of clauses 36 to 39, wherein the V2N interface is an Uu interface.

Clause 41. An apparatus comprising a memory, a transceiver, and a processor communicatively coupled to the memory and the transceiver, the memory, the transceiver, and the processor configured to perform a method according to any of clauses 1 to 40.

Clause 42. An apparatus comprising means for performing a method according to any of clauses 1 to 40.

Clause 43. A non-transitory computer-readable medium storing computer-executable instructions, the computer-executable instructions comprising at least one instruction for causing a computer or processor to perform a method according to any of clauses 1 to 40.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of sharing data about an object, the method comprising:
   detecting the object by using a sensor;
   generating the data about the object based on the detection;
   receiving the data from the sensor;
   determining a relevance of the data; and
   choosing an interface for transmitting the data based on the relevance, wherein the relevance comprises a time span relevance of the data and the time span relevance is based on how far in time the data is useful.

2. The method of claim 1, wherein the relevance comprises a distance relevance of the data.

3. The method of claim 2, wherein the distance relevance is based on another object that is affected by the data and a distance from the another object to the sensor.

4. The method of claim 2, further comprising:
   transmitting the data using the chosen interface.

5. The method of claim 4, wherein the chosen interface is a vehicle-to-network (V2N) interface or vehicle-to-infrastructure (V2I) interface when the distance relevance is distant proximity and the time span relevance is distant future.

6. The method of claim 5, wherein the V2N interface is an Uu interface.

7. The method of claim 4, wherein the chosen interface is a ProSe Communication-5 (PC5) interface when the distance relevance is close proximity and the time span relevance is near future.

8. The method of claim 4, wherein the chosen interface is a ProSe Communication-5 (PC5) interface and a vehicle-to-network (V2N) interface when the distance relevance is both close proximity and distant proximity and the time span relevance is both near future and distant future.

9. A mobile device, comprising:
   a memory;
   a sensor to detect an object and generate data about the object; and
   at least one processor communicatively coupled to the memory, the at least one processor configured to:
   receive the data from the sensor;
   determine a relevance of the data; and
   choose an interface for transmitting the data based on the relevance, wherein the relevance comprises a time span relevance of the data and the time span relevance is based on how far in time the data is useful.

10. The mobile device of claim 9, wherein the relevance comprises a distance relevance of the data.

11. The mobile device of claim 10, wherein the distance relevance is based on another object that is affected by the data and a distance from the another object to the sensor.

12. The mobile device of claim 10, wherein the at least one processor is further configured to:
    transmit the data using the chosen interface.

13. The mobile device of claim 12, wherein the chosen interface is a ProSe Communication-5 (PC5) interface when the distance relevance is close proximity and the time span relevance is near future.

14. The mobile device of claim 12, wherein the chosen interface is a vehicle-to-network (V2N) interface or vehicle-to-infrastructure (V2I) interface when the distance relevance is distant proximity and the time span relevance is distant future.

15. The mobile device of claim 14, wherein the V2N interface is an Uu interface.

16. The mobile device of claim 12, wherein the chosen interface is a ProSe Communication-5 (PC5) interface and a vehicle-to-network (V2N) interface when the distance relevance is both close proximity and distant proximity and the time span relevance is both near future and distant future.

17. A mobile device, comprising:
    means for detecting an object by using a sensor;
    means for generating data about the object based on the detection;
    means for receiving the data from the sensor;
    means for determining a relevance of the data; and means for choosing an interface for transmitting the data based on the relevance, wherein the relevance comprises a time span relevance of the data and the time span relevance is based on how far in time the data is useful.

18. The mobile device of claim 17, wherein the relevance comprises a distance relevance of the data.

19. The mobile device of claim 18, wherein the distance relevance is based on another object that is affected by the data and a distance from the another object to the sensor.

20. The mobile device of claim 18, further comprising:
means for transmitting the data using the chosen interface.

21. The mobile device of claim 20, wherein the chosen interface is a ProSe Communication-5 (PC5) interface when the distance relevance is close proximity and the time span relevance is near future.

22. The mobile device of claim 20, wherein the chosen interface is a vehicle-to-network (V2N) interface or vehicle-to-infrastructure (V2I) interface when the distance relevance is distant proximity and the time span relevance is distant future.

23. The mobile device of claim 22, wherein the V2N interface is an Uu interface.

24. The mobile device of claim 20, wherein the chosen interface is a ProSe Communication-5 (PC5) interface and a vehicle-to-network (V2N) interface when the distance relevance is both close proximity and distant proximity and the time span relevance is both near future and distant future.

25. A non-transitory computer-readable medium storing computer-executable instructions that, when executed by a processor, cause the processor to:
receive data about an object from a sensor;
determine a relevance of the data; and
choose an interface for transmitting the data based on the relevance, wherein the relevance comprises a time span relevance of the data and the time span relevance is based on how far in time the data is useful.

26. The non-transitory computer-readable medium of claim 25, wherein the relevance comprises a distance relevance of the data.

27. The non-transitory computer-readable medium of claim 26, wherein the distance relevance is based on another object that is affected by the data and a distance from the another object to the sensor.

28. The non-transitory computer-readable medium of claim 26, further comprising computer-executable instructions that, when executed by the processor, cause the processor to:
transmit the data using the chosen interface.

29. The non-transitory computer-readable medium of claim 28, wherein the chosen interface is a ProSe Communication-5 (PC5) interface when the distance relevance is close proximity and the time span relevance is near future.

30. The non-transitory computer-readable medium of claim 28, wherein the chosen interface is a vehicle-to-network (V2N) interface or vehicle-to-infrastructure (V2I) interface when the distance relevance is distant proximity and the time span relevance is distant future.

31. The non-transitory computer-readable medium of claim 30, wherein the V2N interface is an Uu interface.

32. The non-transitory computer-readable medium of claim 28, wherein the chosen interface is a ProSe Communication-5 (PC5) interface and a vehicle-to-network (V2N) interface when the distance relevance is both close proximity and distant proximity and the time span relevance is both near future and distant future.

* * * * *